W. F. HAMILTON.
CORN HEADER.
APPLICATION FILED OCT. 1, 1919.

1,343,884.

Patented June 15, 1920.

Inventor
William Francis Hamilton
by Nestall and Wallace
his Attorneys

UNITED STATES PATENT OFFICE.

WILLIAM FRANCIS HAMILTON, OF VENTURA, CALIFORNIA.

CORN-HEADER.

1,343,884.   Specification of Letters Patent.   Patented June 15, 1920.

Application filed October 1, 1919. Serial No. 327,781.

*To all whom it may concern:*

Be it known that I, WILLIAM FRANCIS HAMILTON, a citizen of the United States, residing at Ventura, in the county of Ventura and State of California, have invented new and useful Improvements in Corn-Headers, of which the following is a specification.

This invention relates to a device for cutting off the heads of corn and like plants, and pertains particularly to cutting means in combination with means for bringing the stalks of the former in position to be severed adjacent the head. If the heads are severed with a portion of the green stalk and the severed heads placed in piles, the corn will heat and spoil.

My invention is particularly applicable to heading Kafir corn. This cereal grows with the heads at varying heights, and the heads ripen while the stalks are still green. Some of the heads due to their weight, hang over from the stalk in inverted position. It is necessary in cutting the same by machine to bring the heads to approximately the same level, hereafter called "equalizing." Due to the nature of the stalks, the latter break easily, and, if bent, do not quickly recover their former upright position. It is therefore necessary, and it is an object of my invention to provide means for positively feeding to the cutting means the corn with heads equalized. It is a further object of this invention to provide a supporting comb to prevent the bent stalks from sinking with the heads below the cutting means.

In addition to the broader features of my invention, other objects thereof are to provide details of structure, whereby stalks which are down and heads which are hanging may be lifted sufficiently to enable them to be successfully cut.

Figure 1:
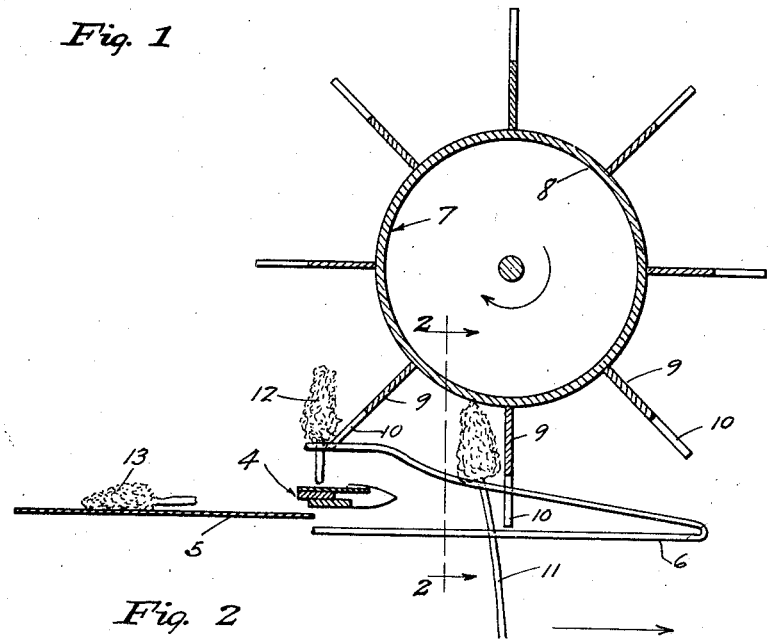
Figure 2:
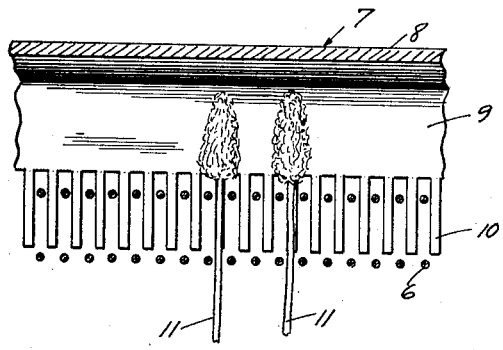
Figure 3:
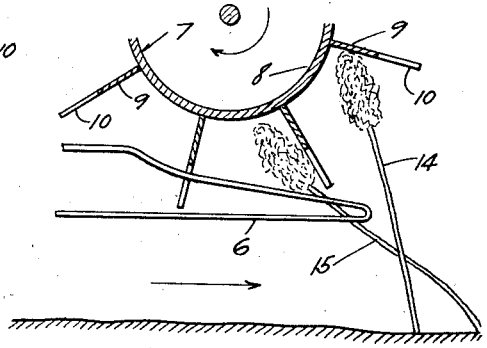

I accomplish these objects by means of the embodiment of my invention illustrated in the accompanying drawing, in which:

Figure 1 is a vertical section through the reel, knife bar, divider, and cross conveyer, details of the reaper other than the portions shown being of any well known type and not forming a part of my invention; Fig. 2 is a fragmentary section taken on the line 2—2 of Fig. 1; and Fig. 3 is a fragmentary view similar to Fig. 1 showing some of the stalks being bent and fed to the cutting means with heads equalized.

Referring more particularly to the drawing, 4 indicates a sickle bar of the well known reciprocating type. Behind the sickle bar is a cross conveyer 5. Extending from the front of the sickle bar are lifter or divider comb teeth 6, which are in effect extensions of the teeth on the sickle bar. The comb teeth engage the stalks and heads which are down and lift them to prevent the heads from passing below the sickle bar. Disposed above the comb and in front of the sickle bar is a reel indicated generally by 7, which is driven in the usual manner of reels on harvesters.

The reel 7 consists of a drum 8, having radially extending impeller blades 9 on the surface thereof. Each blade ends in a series of fingers 10 disposed to sweep between the comb teeth. They are of such length that they will clear the sickle bar 4.

Referring particularly to Fig. 1, the header operates upon stalks which are upright and of the average height for the sickle bar to cut. The stalks enter between the divider teeth, the heads being engaged by the paddles 9, maintained by the divider comb above the sickle bar, and delivered to the latter. They are then cut and lifted by the fingers 10, in the manner shown by head 12. The heads then drop upon the cross conveyer 5 as indicated by 13, and are delivered by the conveyer to some other part of the machine.

Stalks which are of greater height than the average, as shown in Fig. 3, are operated upon in the following manner: A paddle 9 engages the head of a stalk 14 and begins to bend the stalk to the lower position of the reel drum adjacent the knife as indicated by 15. The heads are equalized in position between the drum surface and top of the divider comb teeth. The fingers now sweep the stalk with the head equalized to the knife bar, where the stalk is cut adjacent the head, the latter being delivered to the cross conveyer.

It is obvious that I have provided a header which equalizes the heads, positively delivers them to the knife bar, and lifts the hanging heads and stalks which are down.

What I claim is:

1. In a header, the combination of a horizontally disposed cutting means, a dividing comb extending forwardly thereof, an equalizing feeder traveling downwardly toward said cutting means in advance thereof, impellers extending from said feeder for sweeping the plants being reaped toward said cutting means, and fingers carried by said feeder disposed to enter between the teeth of said comb.

2. In a header, the combination of a horizontally disposed cutting means, a divider comb extending forwardly thereof, an equalizing reel in advance of said cutting means, blades extending from said reel so as to sweep plants being reaped downwardly between the teeth of said comb and toward said cutting means, and fingers carried by said reel disposed to enter between the teeth of said comb.

3. In a header, the combination of a horizontally disposed cutting means, a divider comb extending forwardly thereof, an equalizing feeder having an endless surface traveling downwardly and toward said cutting means in advance thereof, and impellers extending from said surface for sweeping the plants being reaped between the teeth of said comb and toward said cutting means.

4. In a header, the combination of a horizontally disposed cutting means, a dividing comb extending forwardly thereof, an equalizing feeder having an endless surface traveling downwardly toward said cutting means in advance thereof, impellers extending from said surface for sweeping the plants being reaped toward said cutting means, and fingers carried by said feeder disposed to enter between the teeth of said comb.

5. In a header, the combination of a horizontally disposed cutting means, a reel disposed in advance of said cutting means having a cylindrical surface, blades extending from said surface disposed so as to sweep plants being reaped downwardly and toward said cuttting means.

6. In a header, the combination of a horizontally disposed cutting means, a divider comb extending forwardly thereof, an equalizing reel in advance of said cutting means having a cylindrical surface, and blades extending from said surface so as to sweep the plants being reaped downwardly between the teeth of said comb and toward said cutting means.

7. In a header, the combination of a horizontally disposed cutting means, a divider comb extending forwardly thereof, an equalizing reel in advance of said cutting means having a cylindrical surface, blades extending from said surface so as to sweep plants being reaped downwardly between the teeth of said comb and toward said cutting means, and fingers carried by said reels disposed to enter between the teeth of said comb.

8. In a header, the combination of a horizontally disposed cutting means, a supporting comb extending forwardly thereof, an equalizing feeder traveling downwardly and toward said cutting means in advance thereof, and impellers extending from said feeder for sweeping the plants being reaped toward said cutting means with their heads supported upon said comb.

9. In a header, the combination of a horizontally disposed cutting means, a supporting comb extending forwardly thereof, an equalizing feeder traveling downwardly and toward said cutting means in advance thereof, and impellers extending from said feeder for sweeping the plants being reaped between the teeth of said comb toward said cutting means with the heads thereof supported upon said comb.

In witness that I claim the foregoing I have hereunto subscribed my name this 23rd day of September, 1919.

WILLIAM FRANCIS HAMILTON.